US009420475B2

(12) United States Patent
Parron et al.

(10) Patent No.: US 9,420,475 B2
(45) Date of Patent: Aug. 16, 2016

(54) RADIO COMMUNICATION DEVICES AND METHODS FOR CONTROLLING A RADIO COMMUNICATION DEVICE

(71) Applicant: Intel Mobile Communications GmbH, Neubiberg (DE)

(72) Inventors: Jerome Parron, Fuerth (DE); Peter Kroon, Green Brook, NJ (US)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

(21) Appl. No.: 13/762,408

(22) Filed: Feb. 8, 2013

(65) Prior Publication Data

US 2014/0226560 A1  Aug. 14, 2014

(51) Int. Cl.
  *H04W 4/00* (2009.01)
  *H04W 24/02* (2009.01)
  *H04L 1/20* (2006.01)
  *H04L 12/841* (2013.01)
  *H04L 29/08* (2006.01)

(52) U.S. Cl.
  CPC ............... *H04W 24/02* (2013.01); *H04L 1/205* (2013.01); *H04L 47/283* (2013.01); *H04L 67/322* (2013.01)

(58) Field of Classification Search
  CPC ........................... H04L 47/10; H04L 49/9005
  USPC ....................... 370/230, 230.1, 231, 235–236, 370/252–253, 352, 412, 428–429, 508, 370/516–517, 519, 498
  See application file for complete search history.

(56) References Cited

U.S. PATENT DOCUMENTS

| 6,452,950 | B1* | 9/2002 | Ohlsson et al. ............... 370/516 |
| 6,721,834 | B2* | 4/2004 | Das et al. ..................... 710/117 |
| 6,735,192 | B1* | 5/2004 | Fried ................. H04L 29/06027 370/352 |
| 6,862,298 | B1* | 3/2005 | Smith et al. .................. 370/516 |
| 7,103,063 | B2* | 9/2006 | Fang ............................. 370/452 |
| 7,961,755 | B2* | 6/2011 | Harel et al. ................... 370/466 |
| 8,503,414 | B2* | 8/2013 | Ho et al. ....................... 370/338 |
| 8,750,849 | B1* | 6/2014 | Adib ...................... H04L 47/10 455/412.2 |
| 9,154,569 | B1* | 10/2015 | Dropps .................. H04L 67/28 |
| 2004/0047331 | A1 | 3/2004 | Jang |
| 2004/0170186 | A1* | 9/2004 | Shao ................... H04L 12/5693 370/412 |
| 2005/0152280 | A1* | 7/2005 | Pollin ..................... H04L 41/00 370/252 |
| 2006/0077994 | A1 | 4/2006 | Spindola et al. |
| 2006/0251130 | A1* | 11/2006 | Greer ..................... G10L 21/04 370/508 |

(Continued)

FOREIGN PATENT DOCUMENTS

CN              1496157 A       5/2004

OTHER PUBLICATIONS

3GPP TS 26.114 V12.0.0 (Dec. 2012); Technical Specification Group Services and System Aspects; IP Multimedia Subsystem (IMS); Multimedia Telephony; Media handling and interaction (Release 12); pp. 1-270; Section 6.2.1 + Section 8.

(Continued)

*Primary Examiner* — Kevin Mew
(74) *Attorney, Agent, or Firm* — Viering, Jentschura & Partner

(57) ABSTRACT

A radio communication device may be provided. The radio communication device may include: a receiver configured to receive data; a buffer configured to buffer a variable amount of the data; a reception condition determiner configured to determine a reception condition indicating a condition under which the receiver receives the data; and a buffer amount setter configured to set the amount of the data based on the determined reception condition.

24 Claims, 5 Drawing Sheets

(56) References Cited

U.S. PATENT DOCUMENTS

| | | | |
|---|---|---|---|
| 2008/0186918 A1* | 8/2008 | Tinnakornsrisuphap | H04L 47/10 370/331 |
| 2008/0192680 A1* | 8/2008 | Meyer | H04L 47/10 370/328 |
| 2009/0298496 A1* | 12/2009 | Pettersson et al. | 455/434 |
| 2010/0296634 A1* | 11/2010 | Schulzrinne et al. | 379/45 |
| 2011/0002269 A1 | 1/2011 | Ranta-Aho et al. | |
| 2011/0064205 A1* | 3/2011 | Boni et al. | 379/45 |
| 2011/0125392 A1* | 5/2011 | Hao | 701/118 |
| 2011/0125583 A1* | 5/2011 | Hao | 705/14.64 |
| 2011/0261146 A1* | 10/2011 | Kamath et al. | 348/14.08 |
| 2013/0094472 A1* | 4/2013 | Klingenbrunn et al. | 370/331 |
| 2013/0279376 A1* | 10/2013 | Ahmadi | H04W 16/14 370/277 |
| 2013/0289872 A1* | 10/2013 | Segev | 701/467 |
| 2014/0105046 A1* | 4/2014 | Tellado et al. | 370/252 |

OTHER PUBLICATIONS

Office Action received for the corresponding Chinese patent application No. 201410044825.3, mailed Jul. 15, 2015, 27 pages including 17 pages of English translation.

* cited by examiner

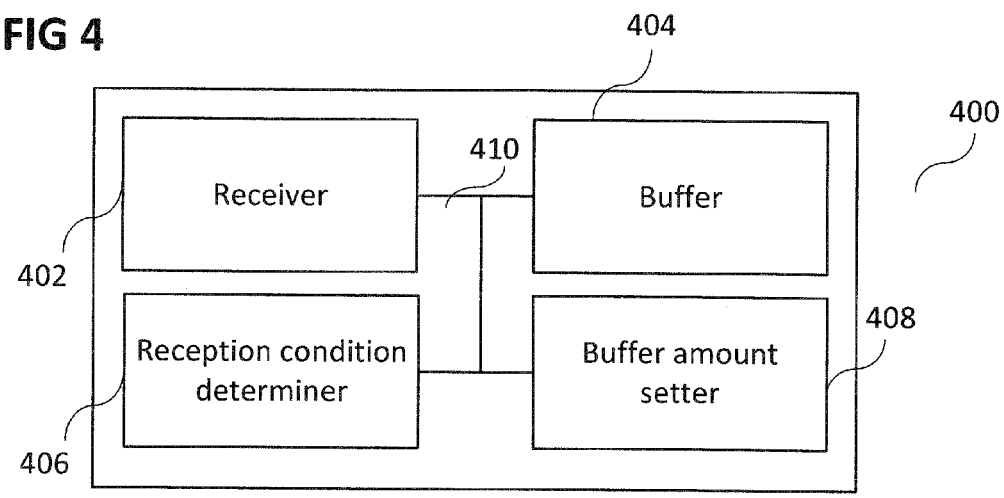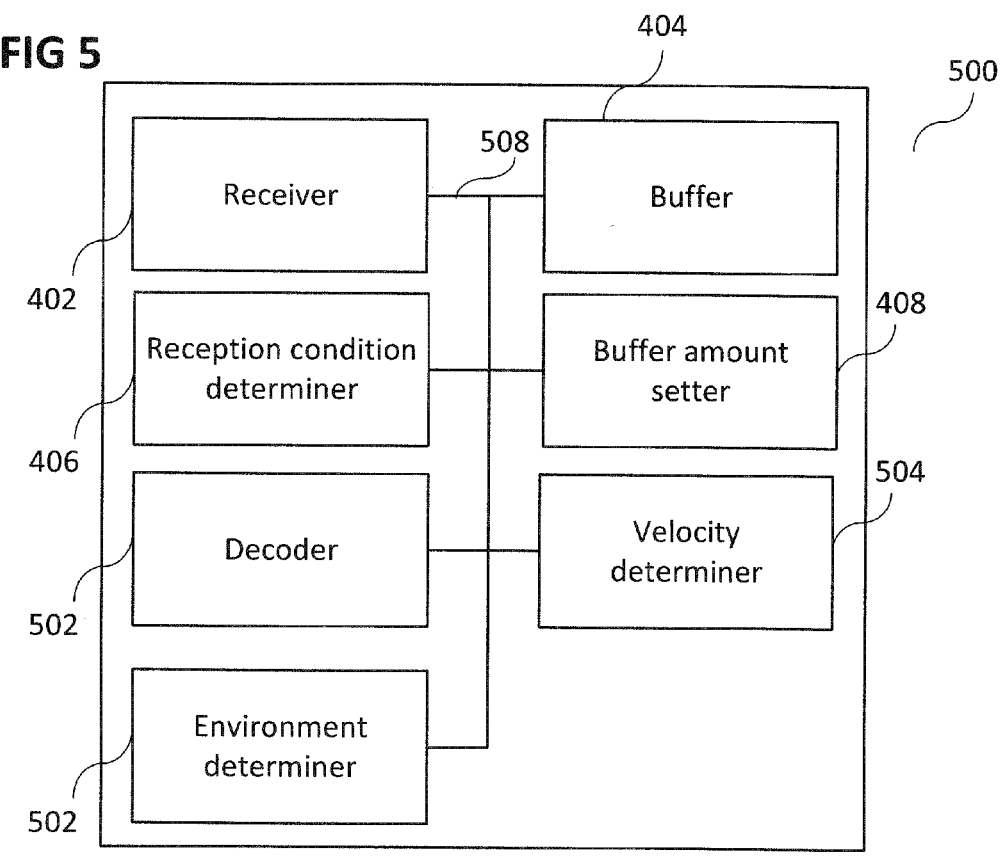

RADIO COMMUNICATION DEVICES AND METHODS FOR CONTROLLING A RADIO COMMUNICATION DEVICE

TECHNICAL FIELD

Aspects of this disclosure relate generally to radio communication devices and methods for controlling a radio communication device.

BACKGROUND

Wireless connections may introduce delay and jitter in the delivery of data packets.

The delay and jitter in the reception of data packets containing streamed media data (such as voice, audio, video) may be impacting the quality of media packet services (for example by loss of data or delay in the media signal (for example audio or video)). This impact may be even more severe if media streaming is used in the context of real-time communications.

To accommodate the variations in packet reception, a jitter buffer may be used. The size of the buffer may be desired to be as large as needed in order to cope with the delay on the wireless connection, but may be desired to be as small as possible in order not to unnecessarily further delay the data.

SUMMARY

A radio communication device may include: a receiver configured to receive data; a buffer configured to buffer a variable amount of the data; a reception condition determiner configured to determine a reception condition indicating a condition under which the receiver receives the data; and a buffer amount setter configured to set the amount of the data based on the determined reception condition.

A method for controlling a radio communication device may include: receiving data using a receiver; buffering a variable amount of the data; determining a reception condition indicating a condition under which the receiver receives the data; and setting the amount of the data based on the determined reception condition.

A radio communication device may include: a buffer configured to buffer a variable amount of received data, wherein the variable amount depends on a condition under which the radio communication device receives the data.

A method for controlling a radio communication device may include: buffering a variable amount of received data, wherein the variable amount depends on a condition under which the radio communication device receives the data.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which:

FIG. 4 shows a radio communication device with a receiver, a buffer, a reception condition determiner, and a buffer amount setter;

FIG. 5 shows a radio communication device with a receiver, a buffer, a reception condition determiner, a buffer amount setter, a decoder, a velocity determiner, and an environment determiner;

DESCRIPTION

Figure 1:
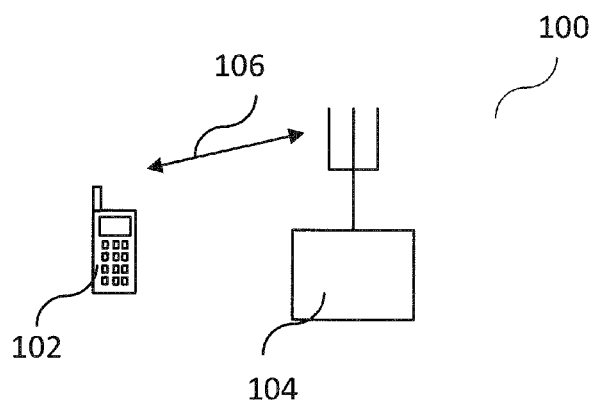
FIG. 1 shows a mobile radio communication system.

The following detailed description refers to the accompanying drawings that show, by way of illustration, specific details and aspects of the disclosure in which the invention may be practiced. These aspects of the disclosure are described in sufficient detail to enable those skilled in the art to practice the invention. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The term "protocol" is intended to include any piece of software, that is provided to implement part of any layer of the communication definition.

A radio communication device may be an end-user mobile device (MD). A radio communication device may be any kind of radio communication terminal, mobile radio communication device, mobile telephone, personal digital assistant, mobile computer, or any other mobile device configured for communication with another radio communication device, a mobile communication base station (BS) or an access point (AP) and may be also referred to as a User Equipment (UE), a mobile station (MS) or an advanced mobile station (advanced MS, AMS), for example in accordance with IEEE 802.16m.

A radio base station (or base station) may be a radio base station operated by a network operator (which may also be referred to as a legacy base station), e.g. a NodeB or an eNodeB, or may be a home base station, e.g. a Home NodeB, e.g. a Home (e)NodeB. In an example, a 'Home NodeB' may be understood in accordance with 3GPP (Third Generation Partnership Project) as a trimmed-down version of a cellular mobile radio base station optimized for use in residential or corporate environments (e.g., private homes, public restaurants or small office areas). Femto-Cell Base Stations (FC-BS) may be provided in accordance with a 3GPP standard, but may also be provided for any other mobile radio communication standard, for example for IEEE 802.16m.

The radio communication device may include a memory which may for example be used in the processing carried out by the radio communication device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

FIG. 1 shows a radio communication system. A mobile radio communication device 102 may receive data from a radio base station 102 like indicated by arrow 106.

Although FIG. 1 shows a diagram illustrating communication between a mobile radio communication device to a network communication system, various devices and methods provided may also be applied in case of mobile radio communication device to mobile radio communication device communication (for example in an ad hoc network).

Wireless connections may introduce delay and jitter in the delivery of data packets.

The delay and jitter may for example vary depending on the radio access technology used (for example LTE (Long Term Evolution, GERAN (GSM (Global System for Mobile Communications) EDGE (Enhanced Data Rates for GSM Evolution) Radio Access Network), UTRAN (UMTS (Universal Mobile Telecommunications System) Terrestrial Radio Access Network), or Wimax) which may influence the transmission rate and delay for retransmission.

The delay and jitter may for example vary depending on the environment (for example a rural environment or an urban environment), which may influence the interference level and the number of over the air retransmission.

The delay and jitter may for example vary depending on the distance from the base station influencing the reception level.

The delay and jitter may for example vary depending on the mobility (in other words: the velocity) of the device, for example the radio communication device, leading to handover with service interruption. There may be two aspects: On one side, the mobility that may trigger UE controlled or network control mobility procedure (such as handover), and on the other side, there may be a speed at which the device is moving (for example walking, running, driving). Both may influence the detection of these events, but these influences may come from different sources.

The delay and jitter in the reception of data packets containing streamed media data (such as voice, audio, video) may be impacting the quality of media packet services (for example by loss of data or delay in the media signal (for example audio or video)). This impact may be even more severe if media streaming is used in the context of real-time communications.

Today media over IP (Internet protocol) solutions may mainly be used in a static environment (for example on a desktop phone or on desktop computers). With the introduction of IMS (IP (Internet Protocol) Multimedia Subsystem) over LTE, the media over IP solution may be used in a dynamic environment. It will be understood that IMS is an example for IP communication in a dynamic environment, and that various devices and methods provided may be used in any communication system, in which communication in a dynamic environment is provided. This may have a higher impact on media (for example voice and/or video) quality and may be more sensitive to a change of the radio environment and may consequently be more dependent on the radio access technology.

To accommodate the variations in packet reception, a jitter buffer may be used. The size of the buffer may be desired to be as large as needed in order to copy with the delay on the wireless connection, but may be desired to be as small as possible in order not to unnecessarily further delay the data.

For real-time communications, the size of this buffer (in other words: the amount of data buffered in the buffer) may be desired to be as small as possible to minimize communication delay. The buffer size may be adapted to the smallest size possible for the current channel quality. Existing jitter buffers may be adaptively based on the variance in the reception of RTP (Real-Time Transport Protocol) frames (where for example every 20 or 40 ms may be the typical configuration). Algorithms may analyze the variance in the reception of the RTP frames to increase/decrease the jitter buffer size and/or initiate the play out of the media signal.

The jitter buffer algorithm may currently be based on indirect information (the reception of the RTP frame) to take a decision. Several RTP frames (including the delay to receive them) may be desired to be received before being able to identify a trend and take an adaptation decision. This may lead to some delay before being able to adapt thereby impacting consequently the quality of the media signal. No information related to the cause of the delay is used in the decision process. Commonly used devices are based on an indirect signal (in other words: based on handling of RTP frame). An adaptation control circuit may only manage the jitter buffer based on the variance in the reception of RTP frames without knowing/anticipating source of jitter and delay.

Figure 2:
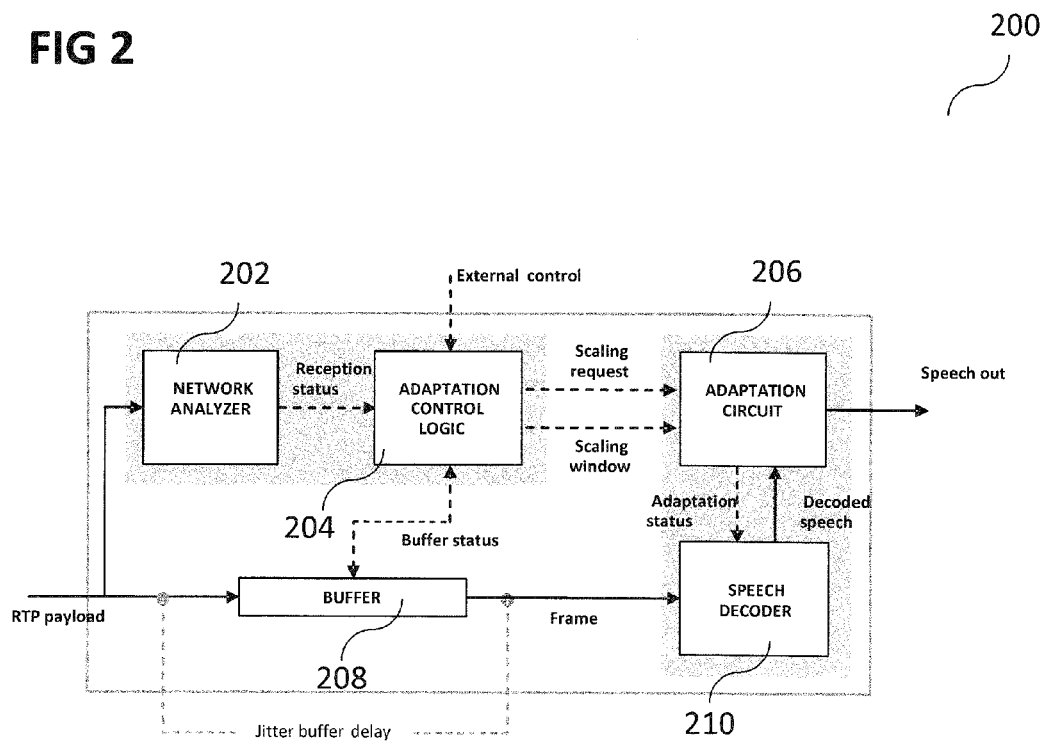
FIG. 2 shows a buffer model for a speech signal according to 3GPP (Third Generation Partnership Project)

FIG. 2 shows a diagram 200 illustrating an existing jitter buffer model according to 3GPP 26.114 section 6.2.1 for speech signal. RTP payload may be inserted to a network analyzer 202 and a buffer 208. The network analyzer 202 may output a reception status to an adaptation control logic 204. The adaption control logic 204 may further receive external control and may exchange a buffer status with buffer 208. The buffer 208 may output a frame to a speech decoder 210. A jitter buffer delay may be considered for a delay from an input time to the buffer 208 and an output time from the buffer 208.

The adaptation control logic 204 may output a scaling request and a scaling window to an adaptation circuit 206. The adaptation circuit 206 may output an adaptation status to the speech decoder 210, and may receive decoded speech from the speech decoder 210. The adaptation circuit 206 may output the speech. Grey boxes shown in FIG. 2 may indicate where the respective circuits are located architecturally in a typical implementation. For example, the grey box including 202 and 204 may typically be part of the protocol stack (e.g. RTP stack). The grey box including 206 and 210 may typically be part of the signal processing unit (typically a DSP (digital signal processor)).

Devices and methods may be provided which may use anticipator signals to determine the jitter buffer adaption rule.

Information coming from and/or related to the radio access technology may be used to estimate potential delay/jitter before the audio frame is actually received. For instance, the following information may be used:

Signal quality (for example LTE RSRP (reference signal received power)/RSRQ (reference signal received quality)), which may allow to adapt the buffer size based on the radio signal quality and radio signal quality variation;

Retransmission rate: These rates may differ based on the technology used but may be smaller than the media framing at IP level (for example 20 ms for audio). Each radio technology may have a different capability: for LTE, retransmission rate may be every 8 ms; TTI (transmission time interval) on LTE may be 1 ms; TTI on UMTS may be 10 or 20 ms, and 2 ms on HSPA (high speed packet access)): combined with semi persistent scheduling, it may allow to detect an earlier missed or delayed audio frame; it will be understood that the values given here are merely examples, and devices and methods described herein may be used independent from the precise values;

Velocity detection (for example static, pedestrian walk, or high speed mobility): the buffer size may be adapted based on device mobility. At high speed, handovers may be are more frequent and consequently also more audio interruption may occur; or any other sensor information or positioning information.

These anticipator signals (which may also be referred to as reception conditions) may allow to better manage the jitter buffer as there may be more opportunities given to adapt, and it may become easier to estimate a trend to increase/decrease the jitter buffer size. Since jitter buffer adaptation may desire time scaling of the media data (for example removing or adding time segments), having more adaptation opportunities may allow more opportunities to do these signal modifications at signal locations with a minimal perceptual impact.

Consequently the media quality may be improved due to a lower packet loss of valid media data, a short delay or a shortest possible delay, and/or less signal distortion due to better adaptation.

Devices and methods may be provided for enhanced Jitter buffer adaptation based on radio environment.

Devices and methods may be based on the usage of radio access technology information or any other information that may help to anticipate the delay and jitter that may impact the transmission of media signal. The anticipator signals may include or may be new inputs to the adaptation control circuit to better manage the jitter buffer.

Devices and methods may be provided which may use new indicators (which may be referred to as anticipator signals or as reception condition) provided by the radio access technology that may influence the delay and jitter in the transmission of media signal. Such indicators may be radio signal quality indicators, retransmission rate (HARQ (Hybrid automatic repeat request)), time to retransmit, maximal retransmission reached, handover trigger, reselection rate, and/or a velocity indicator (for example based on AGPS (Assisted GPS (Global Positioning System) indication, variation of power level and/or identity of neighboring cells). Furthermore, other anticipator signal not related to radio access technology may be used. For example, various positioning methods (for example based on GPS, GLONASS (Global Navigation Satellite System) or any other satellite assisted positioning) may be used to measure velocity. Coupled to map information, it may also help to detect in which location the UE is (for example city or countryside). Also other sensors may help to determine if the UE is within a building or outside.

Devices and methods may provide a network analyzer circuit which may analyze all the anticipator signals to identify potential causes in delay variation for the reception of media data.

Devices and methods may control the adaptation control circuit to consider the network analyzer output to determine the jitter buffer size, removal and/or addition of media frame and/or time stretching.

Figure 3:
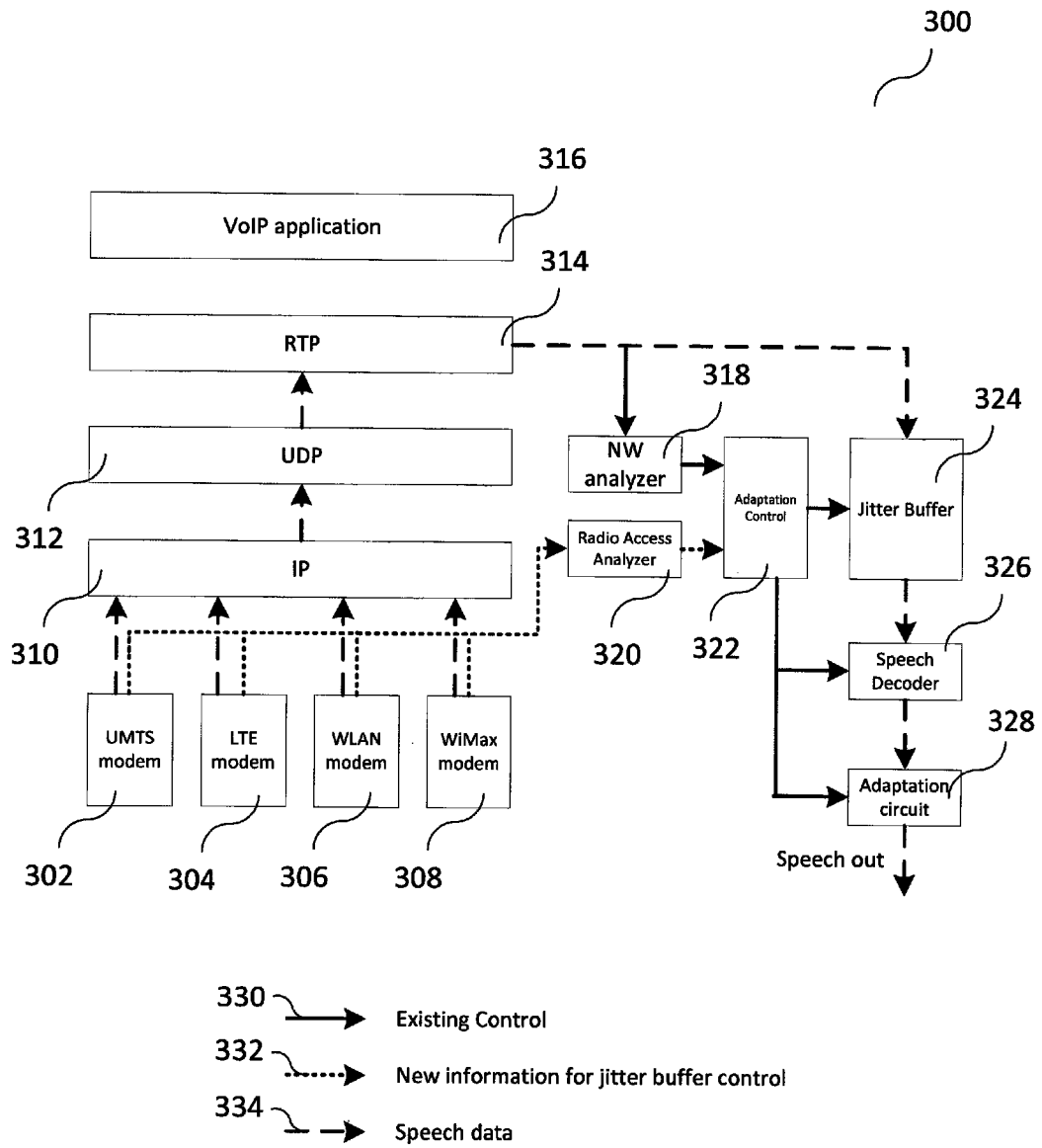
FIG. 3 shows a buffer model for a speech signal.

FIG. 3 shows a diagram 300 illustrating a signal flow for processing a speech signal. Solid line arrows 330 may indicate existing control. Dotted line arrows 332 may indicate new information for jitter buffer control (this new information may be used to determine a reception condition). Dashed line arrows 334 may indicate speech data. A VoIP (voice over IP) application 316 may be provided. Data may be received using a UMTS modem 302, an LTE modem 304, a WLAN modem 306, and/or a WiMax modem 308. It will be understood that data may also be received using any other radio access technology, for example Bluetooth. The received data may be input to an IP layer 310 and to a radio access analyzer 320. The IP layer 310 may output speech data to a UDP (user datagram protocol) layer 312. The UDP layer 312 may output speech data to an RTP layer 314. The RTP layer 314 may output speech data to a jitter buffer 324 and control data to a NW (network) analyzer 318. The NW analyzer 318 may monitor the incoming packet stream to collect reception statistics (e.g. jitter, packet loss) that are needed for jitter buffer adaptation and may output control data to an adaptation control circuit 322. The radio access analyzer 320 may output new information (for example radio signal quality indicators, retransmission rate (HARQ), time to retransmit, maximal retransmission reached, handover trigger, reselection rate, velocity indicator (based on AGPS indication or variation of power level/identity of neighboring cells) for jitter buffer control to the adaptation control circuit 322. The adaptation control circuit 322 may consider the network analyzer output and the radio access analyzer output to determine the jitter buffer size, removal/addition of media frame, and/or amount of time stretching and may output control data to the jitter buffer 324, to a speech decoder 326 and to an adaptation circuit 328. The jitter buffer 324 may output speech data to the speech decoder 326. The speech decoder 326 may output speech data to the adaptation circuit 328, which may output the time adapted speech data. FIG. 3 shows an example of a radio mode as a basis for deciding on the buffering or time stretching or time compression, but is not limited to it. For example, there may be also other sensors (for example a proximity sensor).

FIG. 4 shows a radio communication device 400. The radio communication device 400 may include a receiver 402 configured to receive data. The radio communication device 400 may further include a buffer 404 (which may also be referred to as a buffer circuit or as a jitter buffer) configured to buffer a variable amount of the data. The radio communication device 400 may further include a reception condition determiner 406 (which may also be referred to as a reception condition determination circuit) configured to determine a reception condition indicating a condition under which the receiver 402 receives the data. The radio communication device 400 may further include a buffer amount setter 408 (which may also be referred to as a buffer amount setting circuit) configured to set the amount of the data based on the determined reception condition. The receiver 402, the buffer 404, the reception condition determiner 406, and the buffer amount setter 408 may be coupled with each other, for example via a connection 410, for example an optical connection or an electrical connection, such as for example a cable or a computer bus or via any other suitable electrical connection to exchange electrical signals.

The data may include or may be encoded audio data and/or encoded video data. The number of cumulated media frame may change due to a change in the buffer size, and the media duration may be influenced by stretching or compressing a media frame duration.

The reception condition determiner 406 may use the location as another indication on reception conditions. For example: a radio communication system may know that certain locations are far away from base stations and most likely introduce more jitter, or require a larger buffer. Or a radio communication system may learn adaptively that certain locations tend to have more jitter. This may be useful if one turns on the device, and based on location the device knows that this is in bad jitter condition and it starts with a larger buffer. The opposite may be true as well and the device may start with a shorter buffer.

Furthermore, the radio communication device 400 may use other sensors (not shown), such as a proximity sensor which tells for example if the device 400 is close to a human head or for example a table. In that case some of the antennas could be blocked, resulting in poorer reception and possibly more jitter.

FIG. 5 shows a radio communication device 500. The radio communication device 500 may, similar to the radio communication device 400 of FIG. 4, include a receiver 402. The radio communication device 500 may, similar to the radio communication device 400 of FIG. 4, further include a buffer 404. The radio communication device 500 may, similar to the radio communication device 400 of FIG. 4, further include a reception condition determiner 406. The radio communication device 500 may, similar to the radio communication device 400 of FIG. 4, further include a buffer amount setter 408. The radio communication device 500 may further include a decoder 502, like will be described below, and which may also be referred to as a decoding circuit. The radio communication device 500 may further include a velocity determiner 504, like will be described below, and which may also be referred to as a velocity determination circuit. The radio communication device 500 may further include an environment determiner 506, like will be described below, and which may also be referred to as an environment determination circuit. The receiver 402, the buffer 404, the reception condition determiner 406, the buffer amount setter 408, the decoder 502, the velocity determiner 504, and the environment determiner 506 may be coupled with each other, for example via a connection 508, for example an optical connection or an electrical connection, such as for example a cable or a computer bus or via any other suitable electrical connection to exchange electrical signals.

It will be understood that the setting of the buffer amount may be dynamic.

The reception condition determiner 406 may result in audio time stretching or compression.

The decoder 502 may decode the data. The decoding may be influenced by the reception condition determiner 406 in case of time stretching and/or time compression.

The buffer 404 may buffer the data and output the data to the decoder.

The reception condition may include or may be a reception condition on a protocol layer lower than application layer, for example a physical layer, a data link layer, a network layer, a transport layer, a session layer, and/or a presentation layer.

The velocity determiner 504 may determine a velocity of the radio communication device. The reception condition may include or may be the determined velocity.

The environment determiner 506 may characterize the environment (for example within a building, in transport (for example in a train, or in a car), outdoor, city, countryside, forest, mountain). The reception condition may include or may be the determined characterization of the environment.

The reception condition may include or may be a retransmission rate of the data.

The reception condition may include or may be at least one of a mobility indicator, a mobility procedure control, or an indication of a handover, for example an indication by a signaling protocol whether or not a mobility procedure is to be initialized.

The receiver 402 may receive the data using a communication channel. The reception condition may include or may be an indication of a communication quality of the communication channel.

The buffer 404 may include a memory and a buffer controller configured to store the set variable amount of the data in the memory.

The buffer amount setter 408 may set the amount of the data based on a pre-determined output quality criterion.

Figure 6:
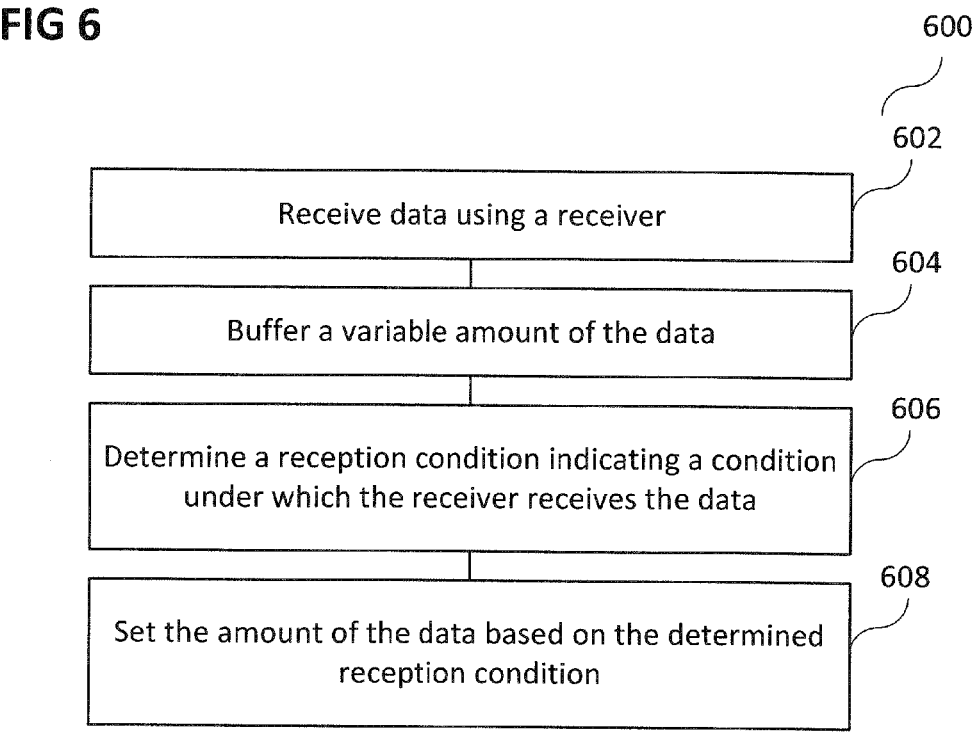
FIG. 6 shows a flow diagram illustrating a method for controlling a radio communication device, for example a radio communication device as shown in FIG. 4 or a radio communication device as shown in FIG. 5.

FIG. 6 shows a flow diagram 600 illustrating a method for controlling a radio communication device. In 602, the radio communication device may receive data using a receiver. In 604, a buffer of the radio communication device may buffer a variable amount of the data. In 606, a reception condition determiner of the radio communication device may determine a reception condition indicating a condition under which the receiver receives the data. In 608, a buffer amount setter of the radio communication device may set the amount of the data based on the determined reception condition.

The data may include or may be encoded audio data and/or encoded video data.

The method may further include decoding the data.

The method may further include buffering the data and outputting the data to the decoding.

The reception condition may include or may be a reception condition on a protocol layer lower than application layer, for example a physical layer, a data link layer, a network layer, a transport layer, a session layer, and/or a presentation layer.

The method may further include determining a velocity of the radio communication device. The reception condition may include or may be the determined velocity.

The method may further include determining an environment characteristic of the radio communication device. The reception condition may include or may be the determined environment characteristics.

The reception condition may include or may be a retransmission rate of the data.

The reception condition may include or may be at least one of a mobility indicator, a mobility procedure control, or an indication of a handover, for example an indication by a signaling protocol whether or not a mobility procedure is to be initialized.

The method may further include receiving the data using a communication channel. The reception condition may include or may be an indication of a communication quality of the communication channel.

The radio communication device may buffer the data in a memory. The method may further include storing the set variable amount of the data in the memory.

The method may further include setting the amount of the data based on a pre-determined output quality criterion.

Figure 7:
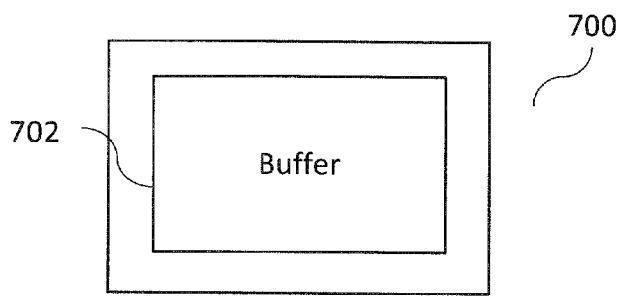
FIG. 7 shows a radio communication device with a buffer.

FIG. 7 shows a radio communication device 700. The radio communication device 700 may include a buffer 702 configured to buffer a variable amount of received data. The variable amount may depend on a condition under which the radio communication device 700 receives the data.

The received data may include or may encoded audio data and/or encoded video data.

Figure 8:
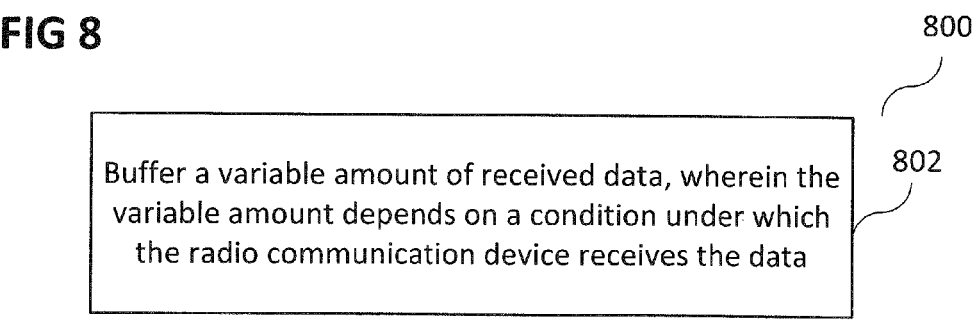
FIG. 8 shows a diagram illustrating a method for controlling a radio communication device, for example a radio communication device as shown in FIG. 7.

FIG. 8 shows a diagram 800 illustrating a method for controlling a radio communication device. In 802, a buffer of the radio communication device may buffer a variable amount of received data. The variable amount may depend on a condition under which the radio communication device receives the data.

The received data may include or may be encoded audio data and/or encoded video data.

Figure 9:
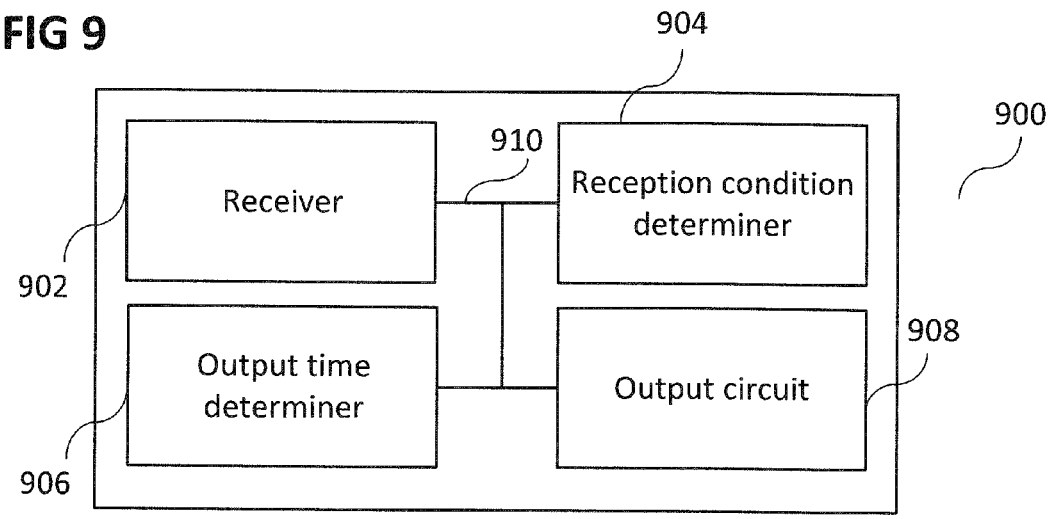
FIG. 9 shows a radio communication device with a receiver, a reception condition determiner, an output time determiner, and an output circuit.

FIG. 9 shows a radio communication device 900. The radio communication device 900 may include a receiver 902 configured to receive data, wherein the data comprises at least one of audio data or video data. The radio communication device 900 may further include a reception condition determiner 904 (which may also be referred to as a reception condition determination circuit) configured to determine a reception condition indicating a condition under which the receiver 902 receives the data. The radio communication device 900 may further include an output time determiner 906 (which may also be referred to as an output time determination circuit) configured to determine an output time of the received data based on the determined reception condition. The radio communication device 900 may further include an output circuit 908 configured to output the at least one of audio data or video data at the determine output time. The receiver 902, the reception condition determiner 904, the output time determiner 906, and the output circuit 908 may be coupled with each other, for example via a connection 910, for example an optical connection or an electrical connection, such as for example a cable or a computer bus or via any other suitable electrical connection to exchange electrical signals.

The output time determiner 904 may modify the at least one of audio data or video data for at least one of stretching or compression.

Figure 10:
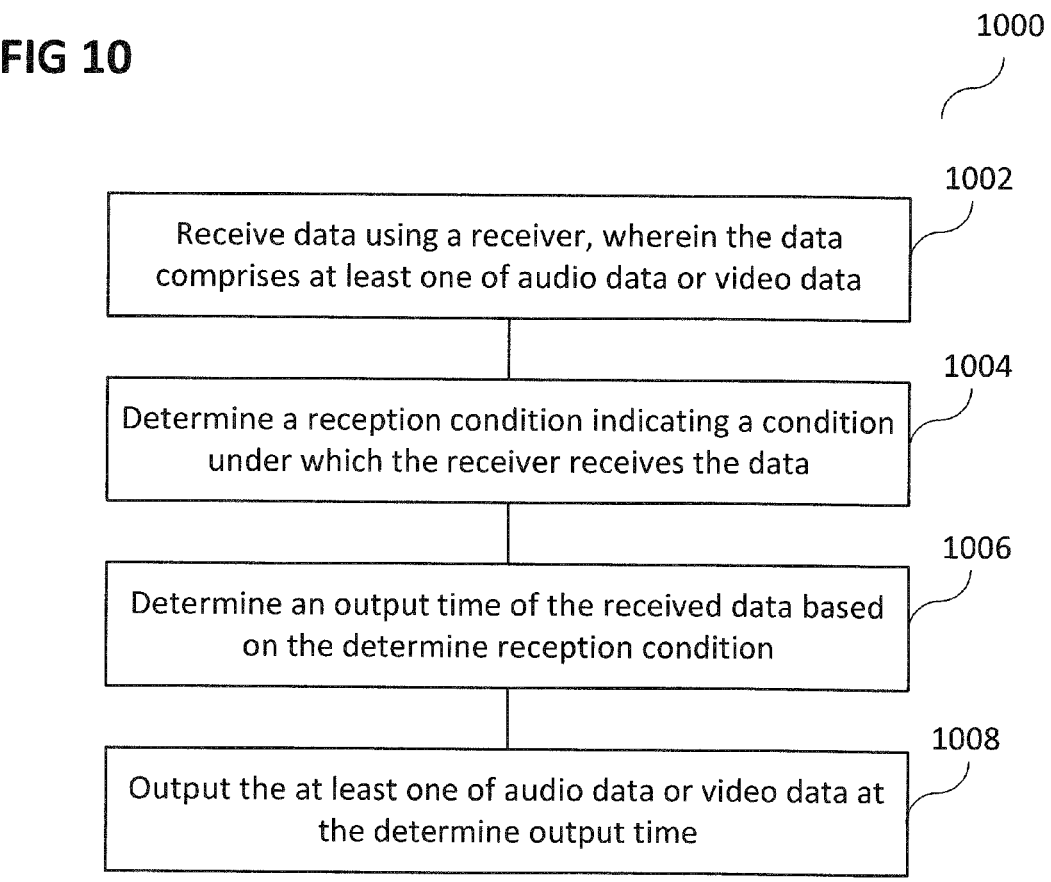
FIG. 10 shows a flow diagram illustrating a method for controlling a radio communication device, for example a radio communication device as shown in FIG. 9.

FIG. 10 shows a flow diagram 1000 illustrating a method for controlling a radio communication device, In 10002, a receiver of the radio communication device may receive data, wherein the data may include or may be at least one of audio data or video data. In 1004, a reception condition determiner of the radio communication device may determine a reception condition indicating a condition under which the receiver receives the data. In 1006, an output time determiner of the radio communication device may determine an output time of the received data based on the determined reception condition. In 1008, an output circuit of the radio communication device may output the at least one of audio data or video data at the determine output time.

The output time determiner of the radio communication device may modify the at least one of audio data or video data for at least one of stretching or compression.

Any one of the radio communication devices or network devices described above may be configured according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), DataTAC, iDEN (Integrated Digital Enhanced Network), PDC (Personal Digital Cellular), PHS (Personal Handyphone System), WiDEN (Wideband Integrated Digital Enhanced Network), iBurst, Unlicensed Mobile Access (UMA, also referred to as 3GPP Generic Access Network, or GAN standard).

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device comprising:
   a receiver configured to receive data according to a radio access technology;
   a buffer configured to buffer a variable amount of the data;
   a reception condition determiner configured to determine a reception condition under which the receiver receives the data based on an anticipator signal independent of the radio access technology and characterizing one or more of an environments group consisting of whether the communication device is within a building, in transport, in a train, in a car, outdoors, in a city environment, in a countryside environment, in a forest environment, in a mountain environment; and
   a buffer amount setter configured to set the amount of the data based on the determined reception condition determined by the reception condition determiner based on the anticipator signal independent of the radio access technology and characterizing one or more of said environments group; and
   a network analyzer circuit configured to analyze the anticipator signal to identify causes in delay variation for the reception as a result of variation from one of said environments group to another one of said environments group or to determine which one of said environments group applies upon turning on the radio communication device, and to generate an output for controlling the buffer amount setter based on said identifying or determining.

2. The radio communication device of claim 1,
   wherein the data comprises at least one of encoded audio data and encoded video data.

3. The radio communication device of claim 1, further comprising:
   a decoder configured to decode the data.

4. The radio communication device of claim 3,
   wherein the buffer buffers the data and outputs the data to the decoder.

5. The radio communication device of claim 1, further comprising:
   a velocity determiner configured to determine a velocity of the radio communication device;
   wherein the reception condition comprises the determined velocity.

6. The radio communication device of claim 1, further comprising:
   an environment determiner configured to characterize an environment of the radio communication device;
   wherein the reception condition comprises the determined characteristics of the environment.

7. The radio communication device of claim 1,
   wherein the reception condition comprises a retransmission rate of the data.

8. The radio communication device of claim 1,
   wherein the reception condition comprises at least one of a mobility indicator, a mobility procedure control, or an indication of a handover.

9. The radio communication device of claim 1,
   wherein the receiver is configured to receive the data using a communication channel;
   wherein the reception condition comprises an indication of a communication quality of the communication channel.

10. The radio communication device of claim 1,
    wherein the buffer comprises a memory and a buffer controller configured to store the set variable amount of the data in the memory.

11. The radio communication device of claim 1,
    the buffer amount setter further configured to set the amount of the data based on a pre-determined output quality criterion.

12. A method for controlling a radio communication device, the method comprising:
    receiving data using a receiver according to a radio access technology;
    buffering a variable amount of the data;
    determining a reception condition under which the receiver receives the data based on an anticipator signal independent of the radio access technology and characterizing one or more of an environments group consisting of whether the communication device is within a building, in transport, in a train, in a car, outdoors, in a city environment, in a countryside environment, in a forest environment, in a mountain environment; and
    setting the amount of the data based on the determined reception condition determined based on the anticipator signal independent of the radio access technology and characterizing one or more of said environments group; and
    analyzing the anticipator signal to identify causes in delay variation for the reception as a result of variation from one of said environments group to another one of said environments group or determining which one of said environments group applies upon turning on the radio communication device, and generating an output for controlling the buffer amount setter based on said identifying or determining.

13. The method of claim 12,
    wherein the data comprises at least one of encoded audio data and encoded video data.

14. The method of claim 12, further comprising:
    decoding the data.

15. The method of claim 14, further comprising:
    buffering the data and outputting the data to the decoding.

16. The method of claim 12,
    wherein the reception condition comprises a reception condition on a protocol layer lower than application layer.

17. The method of claim 12, further comprising:
    determining a velocity of the radio communication device;
    wherein the reception condition comprises the determined velocity.

18. The method of claim 12,
    wherein the reception condition comprises a retransmission rate of the data.

19. A radio communication device comprising:
    a buffer configured to buffer a variable amount of received data according to a radio access technology, wherein the variable amount depends on a condition under which the radio communication device receives the data determined based on the anticipator signal independent of the radio access technology and characterizing one or more of an environments group consisting of whether the communication device is within a building, in transport, in a train, in a car, outdoors, in a city environment, in a countryside environment, in a forest environment, in a mountain environment; and a network analyzer circuit configured to analyze the anticipator signal to identify causes in delay variation for the reception as a result of variation from one of said environments group to another one of said environments group or to determine which one of said environments group applies upon turning on the radio communication device, and to generate an output for controlling the buffer amount setter based on said identifying or determining.

20. The radio communication device of claim 19, wherein the received data comprises at least one of encoded audio data and encoded video data.

21. A method for controlling a radio communication device, the method comprising:

buffering a variable amount of received data according to a radio access technology, wherein the variable amount depends on a condition under which the radio communication device receives the data determined based on the anticipator signal independent of the radio access technology and characterizing one or more of an environments group consisting of whether the communication device is within a building, in transport, in a train, in a car, outdoors, in a city environment, in a countryside environment, in a forest environment, in a mountain environment; and analyzing the anticipator signal to identify causes in delay variation for the reception as a result of variation from one of said environments group to another one of said environments group or determining which one of said environments group applies upon turning on the radio communication device, and generating an output for controlling the buffer amount setter based on said identifying or determining.

22. The method of claim 21, wherein the received data comprises at least one of encoded audio data and encoded video data.

23. A radio communication device comprising:

a receiver configured to receive data, wherein the data comprises at least one of audio data or video data;

a reception condition determiner configured to determine a reception condition indicating a condition which the receiver receives the data based on an anticipator signal independent of the radio access technology and characterizing one or more of an environments group consisting of whether the communication device is within a building, in transport, in a train, in a car, outdoors, in a city environment, in a countryside environment, in a forest environment, in a mountain environment;

an output time determiner configured to determine an output time of the received data based on the determined reception condition determined based on the anticipator signal independent of the radio access technology and characterizing one or more of said environments group;

a network analyzer circuit configured to analyze the anticipator signal to identify causes in delay variation for the reception as a result of variation from one of said environments group to another one of said environments group or to determine which one of said environments group applies upon turning on the radio communication device, and to generate an output for controlling the buffer amount setter based on said identifying or determining; and an output circuit configured to output the at least one of audio data or video data at the determine output time.

24. The radio communication device of claim 23, wherein the output time determiner modifies the at least one of audio data or video data for at least one of stretching or compression.

* * * * *